United States Patent Office 3,320,270
Patented May 16, 1967

3,320,270
CERTAIN 2-ACYLIMIDOTHIAZOLE COMPOUNDS
Charles H. Grogan, Falls Church, Va., and Leonard M. Rice, Minneapolis, Minn., assignors to Tri-Kem Corporation, Washington, D.C., a corporation of the District of Columbia
No Drawing. Filed Oct. 8, 1963, Ser. No. 314,625
4 Claims. (Cl. 260—306.8)

The present invention relates to novel synthetic organic compounds and, more particularly, to novel imides of 2-aminothiazoles, imidazoles and oxazoles and their nuclear substituted derivatives with mono or bicyclic aliphatic or aromatic dicarboxylic acid anhydrides.

It is a primary object of the present invention to provide novel synthetic organic compounds which comprise novel imides of 2-aminothiazoles, imidazoles and oxazoles and their nuclear substituted derivatives with mono or bicyclic aliphatic or aromatic dicarboxylic acid anhydrides.

It is still another important object of the invention to provide novel synthetic organic compounds having particular utility for growth regulatory purposes, both with respect to microorganisms and fungi as well as with respect to malignant tumors in animals.

These and other important advantages and objects of the present invention will become more apparent in connection with the ensuing description and appended claims.

The novel compounds of the present invention have the following general formula:

$$Z\text{-}R \underset{\underset{O}{\parallel}}{\overset{\underset{O}{\parallel}}{\underset{C}{\overset{C}{\underset{\diagdown}{\diagup}}}}} N \underset{C}{\overset{N \text{---} C}{\underset{\diagdown}{\diagup}}} \overset{\longleftarrow}{\underset{Y}{\overset{C}{\diagdown}}} X$$

In the above formula, ring R, when taken together with the dicarboximide structure, forms a ring of at least 5 ring atoms selected from the group consisting of mono and bicyclic aliphatic and aromatic rings, Z is selected from at least one of the group consisting of hydrogen, alkyl, alkenyl, alkoxy, cycloalkyl, nitro, aryl and halogen (the latter including all four halogens); Y is selected from the group consisting of nitrogen, oxygen and sulfur; and X is selected from at least one of the group consisting of alkyl, alkenyl, alkoxy, cycloalkyl, aryl, nitro, halogen (including all four halogens), hydrogen and rings fused to the ring containing Y. As will be apparent from the foregoing, the minimum value of atoms that can be contained in the circle R is 2. As will be further apparent from the definition of ring R, said mono or bicyclic ring may be fully aromatic, partially hydrogenated or fully hydrogenated (aliphatic) and may be substituted or unsubstituted.

While the ring atoms (other than the nitrogen atom of the dicarboximide structure) of ring R are preferably carbon, they are not restricted to carbon. For example, in addition to the dicarboxylic anhydrides listed below, quinolinic anhydride or the like may be utilized. And while there are no upper limits on the chain lengths of the Z and X substituents, lower (1–6) alkyl, alkenyl and alkoxy substituents are preferred. While Y may, as above stated, be nitrogen, oxygen or sulfur, the most desirable compounds within the broad framework of the present invention are those in which Y is oxygen or sulfur. Finally, the rings fused to the ring containing Y, while normally fused to the 4,5 positions of this ring, need not be.

Examples of aliphatic and aromatic dicarboxylic anhydrides that may be employed to obtain the products of the present invention are:

cyclopropane-1,2; cyclobutane-1,3; cyclobutane-1,2;
cyclopentane-1,2; cyclopentane-1,3-; cyclohexane-1,2-
 (hexahydrophthalic);
cyclohexane-1,3-(hexahydroisophthalic); cyclohex-4-
 ene-1,2-(tetrahydrophthalic);
phthalic; 3,4,5,6-tetrachlorophthalic; 4,5-diphenylphthalic;
3,4-dimethoxyphthalic; 3,4,5,6-tetrabromophthalic;
camphoric; (cyclopentane-1,3-1,5,5-trimethyl);
naphthalic; 3-nitrophthalic; succinic; dodecenyl-succinic;
maleic; 3,3-dimethylglutaric; 3,3-diethylglutaric;
4,5-dichlorophthalic; bicyclo[2.2.1]hept-5-ene-2,3-;
7-oxabicyclo [2.2.1]heptane-2,3-; 1-methyl-7-
 oxabicyclo[2.2.1]heptane-2,3-;
1,4-dimethyl-7-oxabicyclo[2.2.1]heptane-2,3-;
2,3-dimethyl-7-oxabicyclo[2.2.1]heptane-2,3-;
and bicyclo[2.2.2]oct-5-ene-2,3-dicarboxylic anhydrides.
Still additional anhydrides include the following phthalic anhydrides: 3-isopropyl-5-methyl; 4,5-diphenyl-; 3,4,5-triphenyl-; 4-phenyl-; 4-ethoxy-; 4-cyclohexyl-; 4-allyl-; 4,5-dicyclohexyl-; etc. Examples of 2-aminothiazoles, imidazoles and oxazoles that may be employed to obtain the products of the present invention are:

2-aminothiazole; 2-aminooxazole; 2-aminoimidazole;
2-amino-5-nitrothiazole; 2-aminobenzimidazole;
2-amino-benzoxazole; 2-amino-4-methylthiazole;
2-amino-6-methylbenzothiazole; 2-aminobenzothiazole;
2-amino-4-biphenylythiazole; 2-amino-6-
 methoxybenzothiazole;
2-amino-6-ethoxybenzothiazole; 2-amino-4-
 isopropylthiazole;
2-amino-4-phenylthiazole; 2-amino-4-hexyl-5-
 nitrothiazole;
2-amino-4-phenyl-5-nitrothiazole;
2-amino-5-iodo-4-methylthiazole;
2-amino-4-isobutylthiazole; 2-amino-4-cyclohexylthiazole;
2-amino-4-allylthiazole; etc.

The novel compounds of the present invention are synthesized by heating together, either in the presence of an inert solvent or without solvent, the appropriate 2-aminothiazole, imidazole or oxazole and a mono or bicyclic aliphatic or aromatic dicarboxylic acid anhydride. Several methods which may be used with advantage are set forth below:

METHOD A

The finely pulverized anhydride and the 2-aminothiazole, imidazole or oxazole are intimately mixed in equimolar quantities and heated in an oil bath until a clear homogeneous melt is obtained and maintained at a temperature sufficient to cyclize the initially formed amic acid to the desired imide. The temperature usually required is in the range of 140–240° C. Occasionally it is necessary to take the temperature up to a higher range momentarily when the reactants do not form a homogeneous melt at the above temperature range. In such instances, the heating time must be relatively short lest extensive decomposition set in. Generally, when it is necessary to heat above 240° C., the imide is formed almost as soon as the melt is obtained.

METHOD B (1) Alternatively, the reactants may be heated in an inert solvent with a boiling range sufficient to give the imide. In the case of nitro substituents on the anhydride or amine moieties, this method has the advantage of maintaining constant temperature. With several of the nitro derivatives, the temperature may stay at 150–160° C. in the oil bath for a time and then rise rapidly as the nitro compound decomposes and leaves only a discolored sooty residue as it rapidly decomposes without exploding. Solvents which have been successfully employed to effect the imide cyclization are: dimethylformamide, glycol diphenyl ether (1,2-diphenoxyethane), tetralin (1,2,3,4-tetrahydronaphthalene), decalin (1,2,3,4,5,6,7,8-octahydronaphthalene), acetic and propionic acids.

(2) In some cases in which there is extensive discloration of the reaction mixture when heating the anhydride and amine moieties together directly to a high temperature, it is advantageous to isolate the intermediate amic acid, purify it, and then proceed to cyclize the purified amic acid. Inert solvents which have been utilized successfully to form the intermediate amic acids readily and in high state of purity are: benzene, toluene, acetone and ethylene chloride.

The novel compounds of the present invention exhibit in varying degrees growth regulatory properties. Not only do they regulate the growth of microorganisms and fungi but the growth of malignant tumors in animals, as well. When administered under standardized test conditions intraperitoneally to mice bearing murine adenocarcinoma 755, murine sarcoma 180 and Lewis lungcarcinoma in BDF1 mice, members of the present group of growth modifying substances markedly prolonged the life span of such animals by inhibiting the growth and spread of the rapidly proliferating cancer, over that of the untreated controls bearing the same cancer.

For example, the administration of the compound 7-oxabicyclo [2.2.1]heptane - 2,3 - dicarboximide - N - (2 - thiazolyl), i.p. 200 mg./kg. once daily to female mice bearing adenocarcinoma 755 resulted in complete inhibition of tumor growth. The administration of the compound of Example III, bicyclo[2.2.1]hept-5-ene-2,3-dicarboximide-N-[2-(5-nitrothiazolyl)], 200 mg./kg. i.p. once daily for 7 days to mice bearing sarcoma 180 produced a 34% inhibition of tumor growth. This same compound when administered i.p. 160 mg./kg. daily for 11 days to BDF1 mice bearing Lewis lungcarcinoma, produced a 79% inhibition of tumor growth. Administration of the compound of Example II, naphthalimide-N-(2-thiazolyl), i.p. daily 500 mg./kg. for 7 days to mice bearing sarcoma 180 produced a 41% inhibition of tumor growth. This last compound, when administered i.p. 400 mg./kg. daily for 11 days to BDF1 mice bearing Lewis lungcarcinoma, produced a 64% inhibition of tumor growth. In all of these examples, the tumor growth inhibition was obtained by comparing the tumor-bearing animals treated with the drug to controls which were untreated.

The following examples will illustrate the procedures employed to obtain the novel compounds of the present invention. As will be apparent, these examples are intended to be illustrative only and not restrictive of the scope of the present application.

*Example I.—Phthalimide, hexahydro-N-(2-thiazolyl) or cyclohexane-1,2-dicarboximide-N-(2-thiazolyl)*

One-tenth molar quantities of hexahydrophthalic anhydride and 2-aminothiazole were finely pulverized and intimately mixed. The mixture was heated in an oil bath to a temperature of 180° C. and maintained there for ½ hour. The brownish melt was heated momentarily to 220° C. and poured while molten into 600 ml. of cold water. It solidified, was filtered off and pulverized. It was dissolved in boiling ethyl acetate, decolorized with Norit A and filtered. Evaporation of the ethyl acetate to ½ its volume, or the addition of 30–60° petroleum ether, or ligroin induced crystallization. This material melted at 98–103° C. Recrystallization from ethyl acetate to a constant melting point gave a material melting at 101.5–103° C.

*Example II.—Naphthalimide-N-(2-thiazolyl)*

One-tenth molar quantities of naphthalic anhydride and 2-aminothiazole were heated in an oil bath as described in Example I. It was necessary to raise the temperature to 310° C. to obtain a homogeneous melt. On cooling, the mass solidified and was dissolved in boiling dimethylformamide, treated with decolorizing carbon and filtered. On cooling in the refrigerator overnight, an 80% yield of the title compound was obtained (M.P. 298–300° C. dec.). Recrystallization from dimethylformamide-water gave an analytically pure material melting at 301–302° C. dec. The addition of water to the mother liquors gave an additional 10% yield of slightly less pure material.

*Example III.—Bicyclo[2.2.1]hept-5-ene-2,3-dicarboximide-N-(5-nitrothiazolyl)*

One-tenth molar quantities of bicyclo[2.2.1]hept-5-ene-2,3-dicarboxylic anhydride and 2-amino-5-nitrothiazole were refluxed for 24 hours in 75 ml. of dimethylformamide. On cooling, crystalline material separated which consisted of uncyclized amic acid and the desired imide. The crystalline material was filtered off and extracted with boiling ethyl acetate. The extract was decolorized with carbon, filtered and refrigerated. The imide separated as light tan crystals (M.P. 173–5° C. dec.) Recrystallization from methyl ethyl ketone or dimethylformamide-water gave the light tan imide (M.P. 175–7° C. dec.).

*Example IV.—3-nitrophthalimide-N-(2-thiazolyl)*

One-tenth molar quantities of 3-nitrophthalic anhydride and 2-aminothiazole were refluxed for 10 hours in dimethylformamide, filtered and cooled. The deep orange solution deposited brown-tan crystals (M.P. 228–230° C. dec.). Recrystallization from acetone produced a material with a melting point of 229–231° C. dec. The addition of an equal volume of water to the dimethylformamide mother liquor and refrigerating yielded another crop of slightly less pure material (M.P. 220–223° C. dec.).

*Example V.—7-oxabicyclo[2.2.1]heptane-2,3-dicarboximide-N-[2-(6-ethoxybenzo)thiazolyl]*

8.4 gm. (0.05 mole) of 7-oxabicyclo[2.2.1]heptane-2,3-dicarboxylic anhydride was dissolved with heating in ethylene chloride and a solution of 9.7 gm. (0.05 mole) of 2-amino-6-ethoxybenzothiazole in ethylene chloride added. The whole was evaporated to near dryness in the water bath, whereupon the amic acid crystallized. The amic acid was removed, pulverized and heated slowly in the oil bath to 180° C. and rapidly to 220° C. and poured while molten into cold water. The precipitate was filtered off, pulverized, dissolved in dimethylformamide, treated with decolorizing carbon and filtered. On addition of an equal volume of water and refrigeration, the crystalline imide separated (M.P. 210–212° C.). Recrystallized from acetone, the product had a melting point of 212–213° C.

*Example VI.—Maleimide-N-(2-thiazolyl)*

One-tenth molar quantities of maleic anhydride and 2-aminothiazole were dissolved in ethylene chloride and refluxed for 3 hours. On cooling, the yellow amic acid crystallized and was removed by filtration. It melted with decomposition above 150° C., changing rapidly with gassing into the orange imide. The imide could be obtained by heating the N-(2-thiazolyl)maleamic acid above its melting point until gassing ceased or by heating the maleamic acid in dimethylformamide and adding water to crystallization. The orange imide melted at 200–206° C. dec. Recrystallization from ethyl acetate produced a product with a melting point of 204–206° C. dec.

*Example VII.—Glutarimide-3,3-dimethyl-N-(2-thiazolyl)*

Melting together one-tenth molar quantities of 3,3-dimethyl-glutaric anhydride and 2-aminothiazole, heating to 220° C., pouring into cold water, filtering, solution in ethyl acetate, decolorization with charcoal and refrigeration yielded the title compound (M.P. 170–175° C.). Recrystallization from ethyl acetate produced a product with a melting point of 177–9° C.

*Example VIII.—7-oxabicyclo[2.2.1]heptane-2,3-dicarboximide-N-[2-(naphtho-1,2-4′,5′)thiazolyl]*

2-aminonaphtho-1,2,4′,5′-thiazole (10 gm., 0.05 mole) and 8.4 gm. (0.05 mole) of 7-oxabicyclo[2.2.1]heptane-2,3-dicarboxylic acid anhydride were dissolved in the minimum of dimethylformamide and the mixture refluxed ½ hr. The dimethylformamide was removed at the water pump and the residue heated rapidly until a clear melt was obtained (270–280° C.). The mass solidified, was dissolved in dimethylformamide, treated with decolorizing carbon and filtered. On adding 4X volume of methanol, the material crystallized and melted at 270° C. It was recrystallized from dimethylsulfoxide-water, washed with acetone, and dried (M.P. 274–5° C.).

According to the methods previously outlined and the detailed illustrative Examples I–VIII, still other compounds coming within the scope of the present invention were prepared. Some of them, listed with their melting points, are:

(1) 3-methyl-3,6-endoxyhexahydrophthalimide-N-(2-thiazolyl) or 1-methyl-7-oxabicyclo[2.2.1]heptane-2,3-dicarboximide-N-(2-thiazolyl), M.P. 157–8° C.
(2) 4-cyclohexene-1,2-dicarboximide-N-(2-thiazolyl), M.P. 108–110° C.
(3) Bicyclo[2.2.1]hept-5-ene-2,3-dicarboximide-N-(2-thiazolyl), M.P. 148.5–150° C.
(4) Phthalimide-3,4,5,6-tetrachloro-N-(2-thiazolyl), M.P. 225–6° C.
(5) DL-camphorimide-N-(2-thiazolyl or 3-azabicyclo-[3.2.1]octane-1,8,8-trimethyl-2,4-dione-N-(2-thiazolyl), M.P. 123–4° C.
(6) 5-methylcyclohex-4-ene-1,2-dicarboximide-N-(2-thiazolyl), M.P. 75–6° C.
(7) Bicyclo[2.2.1]hept-5-ene-2,3-dicarboximide-N-[2-(4-biphenylyl)thiazolyl], M.P. 212–13° C.
(8) Bicyclo[2.2.1]hept-5-ene-2,3-dicarboximide-N-[2-(6-methylbenzo)thiazolyl] M.P. 186–7° C.
(9) Phthalimide-N-(2-thiazolyl), M.P. 208–9° C.
(10) 7-oxabicyclo[2.2.1]heptane-2,3-dicarboximide-N-(2-thiazolyl), M.P. 187–8° C.
(11) 7-oxabicyclo[2.2.1]heptane-2,3-dicarboximide-N-[2-(4-methyl)thiazolyl], M.P. 193–4° C.
(12) Cyclopropane-1,2-dicarboximide-N-[2-(4-methyl)thiazolyl], M.P. 107–8° C.
(13) Cyclobutane-1,2-dicarboximide-N-[2-(4-methyl)thiazolyl], M.P. 113–115° C.
(14) Cyclohexane-1,2-dicarboximide-N-(2-benzimidazolyl), M.P. 265–6° C.
(15) 7-oxabicyclo[2.2.1]heptane-2,3-dicarboximide-N-[2-(5,6-dimethylbenzo)thiazolyl], M.P. 252–253° C.
(16) 7-oxabicyclo[2.2.1]heptane-2,3-dicarboximide-N-[2-(6-methoxybenzo)thiazolyl], M.P. 201–203° C.
(17) 7-oxabicyclo[2.2.1]heptane-2,3-dicarboximide-N-(2-oxazolyl), M.P. 189–191° C.
(18) 7-oxabicyclo[2.2.1]heptane-2,3-dicarboximide-N-[2-(5-chlorobenzo)oxazolyl], M.P. 176–8° C.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A compound of the formula:

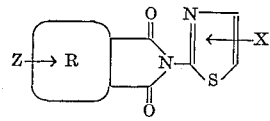

wherein ring R is 1,2-cyclohexane, 1,8-naphthalene, $\Delta^4$-3,6-endomethylene-1,2-cyclohexene, phthalyl, 1,2(3,6-endoxycyclohexane), —CH=CH—, 1,3-trimethylene, $\Delta^4$-1,2-cyclohexene, 1,3-cyclopentane, 1,2-cyclopropane or 1,2-cyclobutane; Z is at least one of hydrogen, nitro, chloro or methyl; and X is at least one of hydrogen, methyl, nitro, naphtho or biphenylyl.

2. 7-oxabicyclo[2.2.1]heptane-2,3 - dicarboximide - N-(2-thiazolyl).

3. Bicyclo[2.2.1]hept-5-ene-2,3-dicarboximide - N-[2-(5-nitrothiazolyl)].

4. Naphthalimide-N-(2-thiazolyl).

References Cited by the Examiner
UNITED STATES PATENTS 2,545,283   3/1951   Johnson _____ 260—302
2,697,100   12/1954  Knott _____ 260—326

ALEX MAZEL, *Primary Examiner.*

HENRY R. JILES, *Examiner.*

ALTON D. ROLLINS, *Assistant Examiner.*